United States Patent

[11] 3,626,977

| [72] | Inventors | James H. Riley<br>Fullerton;<br>Mathias Plotkin, Huntington Beach, both of Calif. |
|---|---|---|
| [21] | Appl. No. | 4,683 |
| [22] | Filed | Jan. 21, 1970 |
| [45] | Patented | Dec. 14, 1971 |
| [73] | Assignee | Circle Seal Corporation<br>Anaheim, Calif. |

[54] COMBINATION CHECK AND PRESSURE RELIEF VALVE
14 Claims, 4 Drawing Figs.

[52] U.S. Cl. ..................................... 137/516.25,
137/536, 137/543.19, 251/DIG. 1
[51] Int. Cl. ............................................. F16k 15/02
[50] Field of Search............................................ 251/DIG. 1,
332, 334; 137/516.25, 516.27, 516.29, 543.19, 536

[56] References Cited
UNITED STATES PATENTS

| 2,729,238 | 1/1956 | Hite | 137/515.7 |
|---|---|---|---|
| 2,730,116 | 1/1956 | Rickard | 137/515.7 X |
| 3,356,103 | 12/1967 | Biello | 137/536 X |
| 2,484,102 | 10/1949 | LeValley | 251/DIG. 1 |
| 2,609,175 | 9/1952 | Von Kokeritz et al. | 137/543.19 |
| 2,676,782 | 4/1954 | Bostock et al. | 137/516.29 |
| 2,797,704 | 7/1957 | McDermott et al. | 137/543.19 |
| 2,800,142 | 7/1957 | Champion | 137/543.19 |
| 2,918,083 | 12/1959 | Clark et al. | 137/543.19 X |
| 2,929,401 | 3/1960 | Cowan | 137/516.29 |
| 2,940,472 | 6/1960 | Chilcoat | 251/332 X |
| 3,058,486 | 10/1962 | McDermott et al. | 137/543.19 X |
| 3,412,931 | 11/1968 | Palmer | 251/368 X |

Primary Examiner—Samuel B. Rothberg
Assistant Examiner—David J. Zobkiw
Attorney—Sellers and Brace ABSTRACT: A combination check and pressure relief valve utilizing a lightweight poppet valve member held closed by a calibrated spring and supplemented by a floating self-aligning resilient O-ring seal held against dilation by an encircling channel-shaped retainer ring. The poppet and O-ring units are held captive in a one-piece cage permanently assembled between the surrounding valve housing components by welded seams, the cage being contoured to provide separate stops for the poppet and for the O-ring retainer unit.

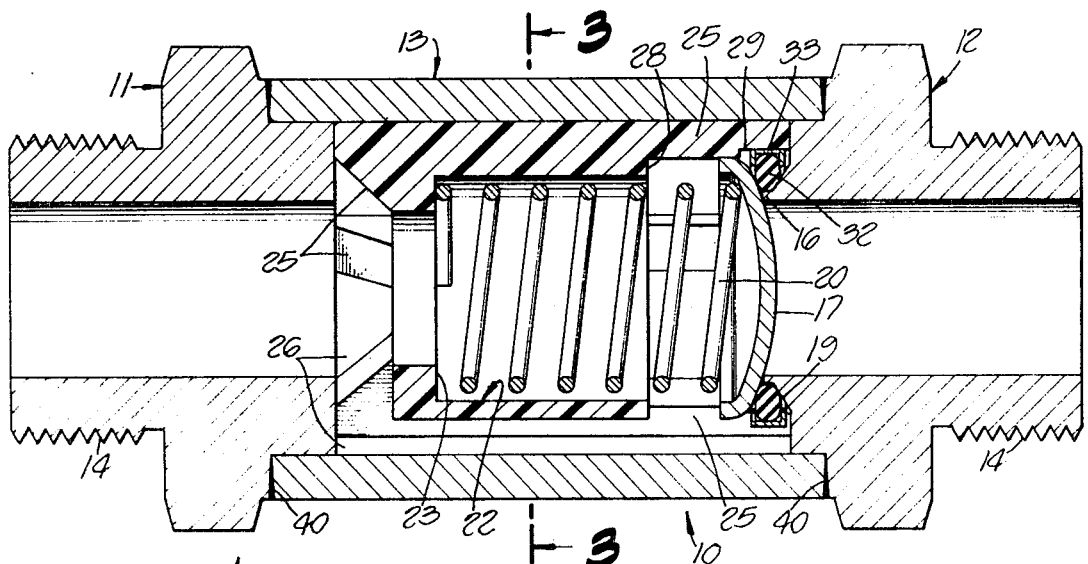
FIG. 1.
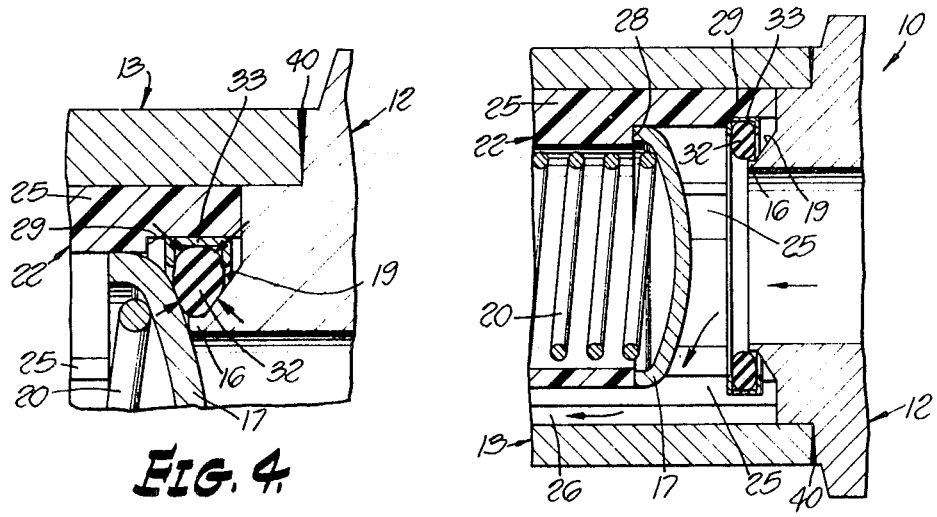
FIG. 4.
FIG. 2.
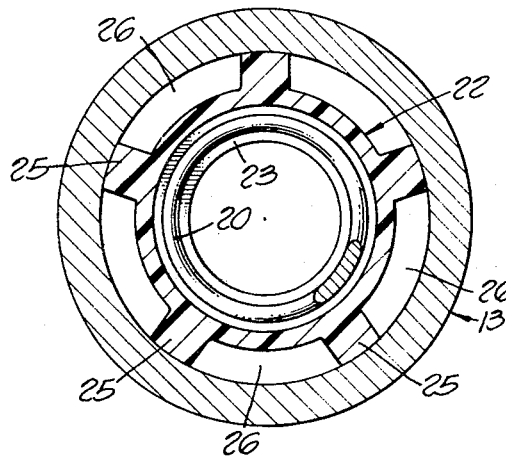
FIG. 3.
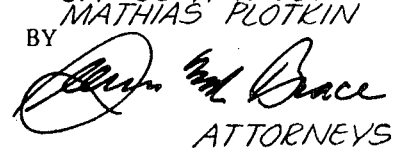
INVENTORS.
JAMES H. RILEY
MATHIAS PLOTKIN
BY
ATTORNEYS

COMBINATION CHECK AND PRESSURE RELIEF VALVE

This invention relates to an improved valve assembly and more particularly to a combination check and pressure relief valve functioning precisely at its design pressure utilizing simple lightweight components including a floating resilient seal having limited freedom of movement to one side of the fluid flow path.

The invention valve construction is suitable for use with inlet pressures ranging from very small values approaching vacuum to high values in the order of 8 to 10,000 p.s.i. and operates in a highly reliable and precise manner under widely varying operating conditions. A limited number of simple components are preferably held permanently assembled within an outer housing the parts of which are welded together under conditions avoiding risk of damage to internal nonmetallic components. The lightweight domed poppet valve controls the cracking pressure of the assembly under the control of a calibrated spring. A floating O-ring unit supplements the poppet valve in sealing the relief valve closed and cooperates therewith in providing a check valve. The O-ring embraces the poppet valve seat and, when designed for pressures in excess of 25 p.s.i., is embraced within an inwardly facing channel-shaped retainer ring effective to prevent dilation of the O-ring. This O-ring and its retainer have limited freedom of movement in the immediate vicinity of the poppet valve seat in order that the O-ring may be self-aligning and seat firmly and accurately along its entire annular seating surface. The stops for the floating O-ring unit are so positioned as to withhold the O-ring to one side of the flow path while the poppet remains open thereby avoiding risk of washout of the O-ring.

Another feature of the design is the provision of a molded plastic cage for the movable components and providing a seat and guide for the calibrated spring as well as separate stops for the poppet and the O-ring units. The cage ring is provided with multiple axial flow passages offering a minimum of resistance and change of direction to fluid flow.

Accordingly, it is a primary object of the present invention to provide an improved simplified and more positive combination pressure relief and check valve suitable for use from very low to pressures as high as 10,000 p.s.i.

Another object of the invention is the provision of a combination pressure relief and check valve having a minimum of lightweight components held permanently assembled within an axial flow housing.

Another object of the invention is the provision of a permanently assembled pressure relief valve having a main relief valve and a cooperating floating seal held assembled within a common cage preferably molded from plastic material.

Another object of the invention is the provision of a combination pressure relief and check valve featuring a lightweight spring biased poppet and a concentrically related floating self-aligning seal unit.

These and other more specific objects will appear upon reading the following specification and claims and upon considering in connection therewith the attached drawing to which they relate.

Referring now to the drawing in which a preferred embodiment of the invention is illustrated:

FIG. 1 is a longitudinal sectional view of one preferred embodiment of the invention valve assembly showing the parts in closed position;

FIG. 2 is a fragmentary view of the valve elements in open position;

FIG. 3 is a cross-sectional view taken along line 3—3 on FIG. 1; and

FIG. 4 is an enlarged fragmentary view through the relief valve and the O-ring seal unit in closed position.

Referring to FIG. 1 there is shown a preferred embodiment of the invention valve assembly, designated generally 10, having a main body formed by a pair of end fittings 11,12 and an intervening sleeve 13. Each of the end fittings may be provided with suitable means, such as screw threads 14, for connecting the assembly to an operating environment. One of the end fittings, as 12, has an inwardly projecting radially narrow annular seat 16, against which the domed relatively thin lightweight poppet valve 17 seats. The exterior base of valve seat 16 flares outwardly as is indicated at 19, the flare being opposite to the flare of the axially opposed adjacent surface of poppet valve 17. These oppositely inclined surfaces cooperate in providing seating surfaces for the resilient seal unit to be described presently.

Poppet valve 17 forms the main check and pressure relief valve and is urged against seat 16 by a calibrated compression spring 20. This spring fits loosely within a unitary tubular cage 22 which may be formed of any suitable material but, as herein illustrated, comprises a one-piece molding of high-strength plastic, such as nylon. The midportion of cage 22 is a thin-walled cylinder provided at one end with an annular seat 23 for spring 20. Extending axially along the exterior of the cage are a plurality of radial ribs 25 which project beyond the opposite ends of the cylindrical main body portion with the right-hand end of the ribs abutting the adjacent annular end surface of fitting 12 and the left-hand end of these ribs abutting the end surface of fitting 11. The spaces 26 between adjacent ribs provide large area open-ended axial flow passages when the poppet valve is opened.

The inner forward edges of ribs 25 are provided with two sets of stop surfaces, the inner set 28 limiting the opening movement of valve 17 and the other set 29 limiting the leftward movement of the floating seal unit to be described presently. Both stops are in use as viewed in FIG. 2.

The seal unit comprises an O-ring 32 of suitable elastomeric material and an inwardly opening channel-shaped rigid retainer ring 33. It will be understood that this seal unit has limited radial and axial freedom of movement with respect to valve seat 16 and the inner edges of ribs 25 of valve cage 22. The purpose of retainer ring 33 is to embrace the exterior of the O-ring and to hold the latter captive and against dilation and to resist washout of the ring upon opening of poppet valve 17. Further assurance against the possibility of washout is provided by stop surfaces 29 which permit the seal unit to move only slightly away from seating surface 19. Accordingly and as is clearly evident from a consideration of FIG. 2, fluid flow to the left past the valve seat occurs past the peripheral edge of the poppet valve and along passages 26 and through end fitting 11 of the valve assembly. Accordingly, this flow has a tendency to divert the seal unit 32,33 to the left and into the flow path but the abutment of retainer ring 33 with stop 29 thwarts this tendency and safeguards against any possibility of the O-ring being displaced from the retainer ring.

The unique and highly effective manner in which the seal supplements the poppet in preventing reverse flow will be better understood by a consideration of FIG. 4 showing the floating self-centering seal unit in closed position. From this figure it will be evident that O-ring 32 has the 4:30 and 7:30 o'clock portions thereof in snug sealing engagement with the outwardly flaring adjacent surface 19 and the corresponding surface of poppet valve 17. The I.D. portion of the O-ring between these two annular sealing areas is exposed to a pressure closely approximating the pressure connected to inlet fitting 12. The remainder and much larger peripheral portion of O-ring 32 is exposed to the pressure downstream from poppet valve 17. This differential pressure may vary considerably but owing to the much greater surface area exposed to this pressure and tending to plate the O-ring under radial compression it is evident that this pressure will be highly effective in holding poppet 17 seated and O-ring 32 tightly seated and sealed in the zone embracing the poppet seat. Extrusion and nibbling of the O-ring is avoided by the guard action provided by valve seat 16 in direct engagement with poppet 17 inwardly of the I.D. of the O-ring.

The assembly of the described components will be quite apparent from the foregoing description. Spring 20, poppet valve 17, and the check valve units 32,33 are assembled in that order within the larger rearwardly facing cage 22. This operation is facilitated if fitting 11 is supported in an upright position with the main body sleeve 13 projecting upwardly therefrom. The cage assembly is then lowered downwardly through the open end of sleeve 13 following which end fitting 12 is lowered into position. Thereafter, electronic welding equipment is employed in known manner to form a high-strength assembly weld between the opposite ends of sleeve 13 and fittings 11,12. This welding technique can be controlled sufficiently precisely to avoid heating the valve housing to any substantial extent at the location of welds 40,40. This technique makes it feasible to employ a cage 22 of precision-molded nylon or the like lightweight high-strength plastic composition and an elastomeric sealing ring 32. Consequently, neither the ring nor the plastic cage is deformed or damaged in any degree by the welding operation and the parts are permanently assembled in a fluidtight manner. Although the described housing comprises three main body parts it will be understood that sleeve 13 may be formed integrally with end fitting 11, if so desired, with the result that a single assembly weld suffices to complete the assembly operation.

The mode of operation after installation of the valve assembly in a pressurized system will be quite apparent from the foregoing description. Poppet valve 17 functions normally as a pressure relief valve and responds and cracks precisely at the same pressure and as this pressure reaches the strength of calibrated spring 20. As this occurs poppet 17 unseats relieving the seating pressure acting on the check valve and allowing fluid flow to occur from fitting 12, through passages 26 and through fitting 11. Poppet 17 may open only slightly or, if the system experiences a sharp increase at the inlet end of the valve, poppet 17 quickly shifts against its stop abutments 28, as shown in FIG. 2, allowing an unrestricted flow past valve seat 16, along passages 26 and outwardly through end fitting 11.

As soon as the surge pressure condition decays to a point below the strength of spring 20, the latter quickly and smoothly restores the poppet valve against seat 16. As the poppet approaches seat 16 it will contact the floating seal unit 32,33 moving the latter if necessary and causing the O-ring to center itself concentrically of seat 16 and to seat against the outwardly tapering surface 19 and against the similarly but oppositely flaring outer annular portion of poppet 17. Pressure applied by these surfaces against the adjacent I.D. surfaces of the O-ring serves to compress the intervening axial portion of the O-ring as well as to dilate or expand the same. However, the O.D. of the O-ring is restrained against expansion by the retainer ring 33 with the result that the O-ring itself is caused to bulge into a configuration approximating that illustrated in FIG. 4. Further deformation and enhanced sealing of the O-ring may result from an increase in the downstream fluid pressure. The higher this pressure becomes the more positive is the action of the O-ring seal 32.

While the particular combination check and pressure relief valve herein shown and disclosed in detail is fully capable of attaining the objects and providing the advantages hereinbefore stated, it is to be understood that it is merely illustrative of the presently preferred embodiment of the invention, and that no limitations are intended to the details of construction or design herein shown other than as defined in the appended claims.

We claim:

1. In combination, fluid flow control means comprising a valve housing having a fluid flow passage and valve seat means concentrically thereof, valve means movable toward and away from said valve seat means, said valve seat means including a resilient O-ring encircling said flow passage and an annular valve seat, the outer periphery of said O-ring being closely embraced and confined within an inwardly facing annular groove formed in a continuous floating retainer ring effective to restrain said O-ring against radial expansion and distortion, means for holding said retainer ring and O-ring captive with limited freedom of movement radially and axially of said annular valve seat but in close proximity thereto, and said O-ring being sized to have simultaneous sealing engagement on one inner axial surface thereof with said valve means and on the opposite inner axial surface thereof with said valve housing in close proximity to said annular valve seat when said valve means is seated against said annular valve seat thereby to supplement and augment the sealing effectiveness of said fluid flow control means.

2. The combination defined in claim 1 characterized in that said valve seat means and said valve means are metallic and said resilient O-ring is nonmetallic.

3. The combination defined in claim 1 characterized in that said valve seat is relieved on the exterior thereof and so shaped relative to adjacent surface of said valve means in the closed position of said valve means as to form an annular chamber radially outward of said valve seat means having outwardly flaring side walls positioned to have continuous ring contact with the juxtaposed axial faces of said O-ring and cooperating to place the I.D. of said O-ring in hoop tension.

4. The combination defined in claim 3 characterized in that said valve means comprises rigid disc means of substantially greater diameter than the seat proper of said valve seat means, and spring means urging said disc means toward seated position relative to said valve seat means.

5. The combination defined in claim 4 characterized in that said rigid disc means has a generally convex surface facing toward said valve seat means an an axially flanged rim projecting away from said convex surface.

6. The combination defined in claim 4 characterized in that said means for holding said retainer ring and said O-ring captive with limited freedom of movement comprises nonmetallic generally tubular cage means surrounding said retainer ring, said valve means and the spring means therefore; said cage means including stop means for limiting axial movement of said retainer ring and other stop means for limiting opening movement of said valve means.

7. The combination defined in claim 6 characterized in that said valve housing comprises at least one tubular end fitting formed with said valve seat, and a tubular main body fitting closely encircling said tubular cage means and cooperating with said end fitting to hold said cage means assembled without end play.

8. The combination defined in claim 7 characterized in that the parts of said valve housing are permanently welded together.

9. The combination defined in claim 7 characterized in that said valve housing comprises a pair of end fittings and an intervening sleeve all permanently welded together.

10. The combination defined in claim 1 characterized in that said holding means for said O-ring retainer ring is effective to hold said retainer ring loosely adjacent and encircling said valve seat while said valve means is unseated and axially removed from said valve seat.

11. The combination defined in claim 6 characterized in that said valve disc means is effective in cooperation with said cage means to restrict fluid flow to a path out of contact with said compression spring means.

12. A pressure relief valve for use in the precise control of fluid pressure in excess of 25 p.s.i., said relief valve comprising a housing having a valve seat, valve means normally held seated on said valve seat by calibrated spring means, said valve means being larger in diameter than said valve seat and having the valve seat contacting surfaces thereof flaring outwardly away from said valve seat, the exterior surfaces of said valve seat being relieved and flaring outwardly away from the flaring portion of said valve means, an O-ring encircling said valve seat with the opposite faces thereof positioned to have sealing contact with the aforesaid oppositely flaring surfaces when said valve means is engaged with said valve seat, and a rigid retainer ring encircling said O-ring and in continuous contact with the O.D. and the adjacent portions of the opposite faces thereof to restrain the same against radial and circumferential expansion thereof whereby the area of said valve subject to fluid pressure is fixed with the result that cracking of said relief valve is governed by said calibrated spring.

13. A pressure relief valve as defined in claim 12 characterized in that said relief valve includes means for holding said retainer ring and the O-ring therein captive with limited freedom to move as a unit radially and axially of said valve seat.

14. A pressure relief valve as defined in claim 13 characterized in that said relief valve includes a molded plastic retainer cage having annular shoulders about the interior thereof providing stop abutments respectively for said calibrated spring, for said valve and for said retainer ring and the O-ring therein.

* * * * *

UNITED STATES PATENT OFFICE
CERTIFICATE OF CORRECTION

Patent No. 3,626,977     Dated December 14, 1971

Inventor(s) James H. Riley, et al

It is certified that error appears in the above-identified patent and that said Letters Patent are hereby corrected as shown below:

Column 4, line 55, after "cage means" should read -- when said valve disc means is resting against said other stop means --.

Signed and sealed this 17th day of October 1972.

(SEAL)
Attest:

EDWARD M. FLETCHER, JR.
Attesting Officer

ROBERT GOTTSCHALK
Commissioner of Patents